G. WOEBER.

Carriage-Spring.

No 40,787.

Patented Dec 1, 1863.

Witnesses.
J. W. Coonly.
Geo. W. Reus.

Inventor.
G. Woeber.
per Munn & Co
Attys.

UNITED STATES PATENT OFFICE.

GALLUS WOEBER, OF DAVENPORT, IOWA.

IMPROVEMENT IN CARRIAGE-SPRINGS.

Specification forming part of Letters Patent No. 40,787, dated December 1, 1863.

*To all whom it may concern:*

Be it known that I, GALLUS WOEBER, of Davenport, in the county of Scott and State of Iowa, have invented a new and Improved Carriage-Spring; and I do hereby declare that the following is a full, clear, and exact description of the same, reference being had to the accompanying drawings, forming a part of this specification, in which—

Figure 1:
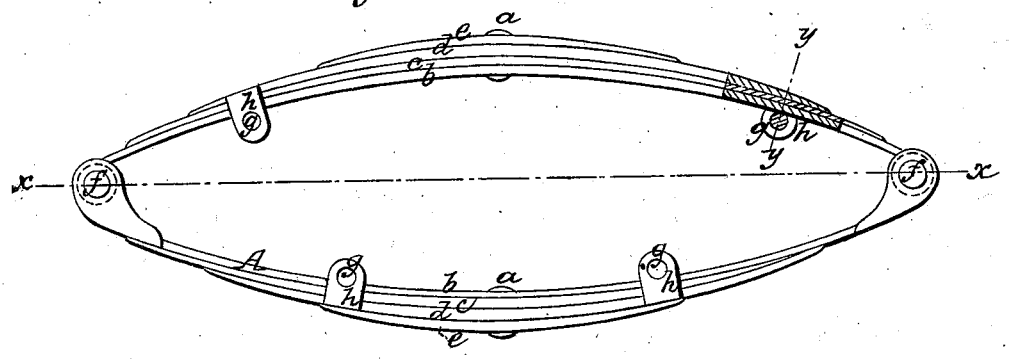
Figure 2:
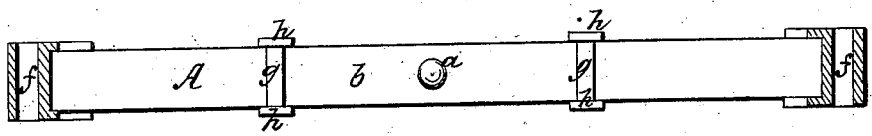
Figure 3:
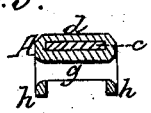

Figure 1 represents a side elevation of my invention, partly in section. Fig. 2 is a horizontal section of the same, taken in the plane indicated by the line $x\,x$, Fig. 1. Fig. 3 is a transverse vertical section of the same, the line $y\,y$, Fig. 1, indicating the plane of section.

Similar letters of reference in the three views indicate corresponding parts.

The invention consists in the arrangement of lugs or ears projecting from the edges of one leaf over and beyond the edges of the succeeding leaves, and provided with pins passing through said lugs close over the inner leaves of a carriage-spring in such a manner that by the action of said lugs and pins the leaves are firmly held together and prevented from springing apart or from shifting laterally without weakening the leaves by holes, and by means which are cheap, simple, and perfectly reliable.

To enable others skilled in the art to make and use my invention, I will proceed to describe it.

A represents an ordinary elliptic spring, made of two halves, which are united by pivots $f$ in the usual manner. Each half of the spring is composed of four (more or less) leaves, $b\,c\,d\,e$, which may be united in the center by rivets $a$, as clearly shown in Figs. 1 and 2 of the drawings. The ends of the bed are held together by pins $g$, which pass through lugs $h$, close over the inner leaves, $b$. Said lugs are made solid with the leaves $d\,d$, and they are turned up at right angles with said surfaces and at such a distance apart that the leaves $b\,c$ fit nicely between them. By these lugs and pins the leaves are firmly held together. They are prevented by the lugs from moving in a lateral direction, and by the pins they are held together and prevented from breaking or bending when the carriage jumps up. The lugs $h$ are produced by welding suitable pieces of iron or steel to the edges of the leaves $d$. After these pieces have been welded and drawn out to the proper length they are turned up parallel to each other and at right angles to the surfaces of the leaf.

The distance between each pair of lugs is such that they just admit the leaves $c\,b$, and after these leaves have been introduced the pins $g$ are inserted in holes previously made either by punching or drilling. By this arrangement the leaves preserve their full strength, it being not necessary to perforate them for the purpose of admitting the studs generally used to hold them in place, and they are preserved from moving in a lateral as well as in a vertical direction, and, furthermore, the labor of making the lugs is less than that of making the holes and inserting the studs.

What I claim as new, and desire to secure by Letters Patent, is—

The lugs $h$, projecting from the edges of the leaf $d$ of a spring, A, and operating in combination with the pins $g$ and leaves $c\,b$ in the manner and for the purpose substantially as specified.

GALLUS WOEBER.

Witnesses:
   JOHN C. KAY,
   ADAM WOEBER.